United States Patent
Gonsalves et al.

(10) Patent No.: US 6,392,710 B1
(45) Date of Patent: May 21, 2002

(54) GRAPHICAL USER INTERFACE FOR FIELD-BASED DEFINITION OF SPECIAL EFFECTS IN A VIDEO EDITING SYSTEM

(75) Inventors: Robert Gonsalves, Wellesley; Brian C. Cooper, Sharon, both of MA (US)

(73) Assignee: Avid Technology, Inc., Tewksbury, MA (US)

(*) Notice: Subject to any disclaimer, the term of this patent is extended or adjusted under 35 U.S.C. 154(b) by 0 days.

(21) Appl. No.: 09/054,859

(22) Filed: Apr. 3, 1998

(51) Int. Cl.⁷ .............................. H04N 9/74; H04N 9/64; H04N 9/44; H04N 7/01; H04N 5/222; G06F 3/00
(52) U.S. Cl. ..................... 348/578; 348/722; 348/576; 348/511; 348/575; 348/441; 345/328; 386/4
(58) Field of Search ............................... 348/578, 511, 348/575, 576, 722, 911, 441, 448; 345/328, 113, 115, 121; 386/4, 52, 55, 64

(56) References Cited

U.S. PATENT DOCUMENTS

| | | | |
|---|---|---|---|
| 4,367,465 A | 1/1983 | Mati et al. ................... | 340/707 |
| 4,492,978 A | 1/1985 | Thomas ....................... | 358/134 |
| 4,571,632 A | 2/1986 | Schaphorst et al. ......... | 358/260 |
| 4,782,397 A | 11/1988 | Kimoto ....................... | 358/256 |
| 5,129,013 A | 7/1992 | Holzmann et al. ............ | 382/44 |
| 5,146,325 A | 9/1992 | Ng .............................. | 358/135 |
| 5,181,113 A | 1/1993 | Chang ......................... | 358/142 |
| 5,283,651 A | 2/1994 | Ishizuka ...................... | 348/704 |
| 5,450,134 A | 9/1995 | Legate ........................ | 348/467 |
| 5,510,843 A | 4/1996 | Keene et al. ................ | 348/446 |
| 5,532,751 A | 7/1996 | Lui .............................. | 348/452 |
| 5,557,334 A | 9/1996 | Legate ........................ | 348/473 |
| 5,559,641 A * | 9/1996 | Kajimoto et al. ........... | 360/14.1 |
| 5,600,376 A | 2/1997 | Casavani et al. ........... | 348/423 |
| 5,625,421 A | 4/1997 | Faroudja et al. ............ | 348/607 |
| 5,633,687 A * | 5/1997 | Bhayani et al. ............. | 348/441 |
| 5,649,171 A | 7/1997 | Craven et al. .............. | 395/500 |
| 5,659,639 A | 8/1997 | Mahoney et al. ........... | 382/309 |
| 5,661,525 A | 8/1997 | Kovačević et al. ......... | 348/452 |
| 5,663,765 A | 9/1997 | Matsuse et al. ............. | 348/448 |
| 5,668,639 A * | 9/1997 | Martin ......................... | 380/52 |
| 5,703,654 A | 12/1997 | Iizuka et al. ............... | 348/446 |
| 5,703,659 A | 12/1997 | Tanaka ........................ | 348/576 |
| 5,732,184 A * | 3/1998 | Chao et al. .................... | 386/55 |
| 5,760,767 A * | 6/1998 | Shore et al. ................. | 345/328 |
| 5,781,435 A * | 7/1998 | Holroyed et al. ........... | 364/192 |
| 5,852,438 A * | 12/1998 | Tomizawa et al. .......... | 345/328 |
| 5,874,952 A * | 2/1999 | Morgan ....................... | 345/328 |
| 5,877,781 A * | 3/1999 | Tomizawa et al. .......... | 345/521 |
| 5,886,692 A * | 3/1999 | Brewer et al. .............. | 345/328 |
| 5,929,942 A * | 7/1999 | Porrka et al. ............... | 348/722 |
| 5,930,445 A * | 7/1999 | Peters et al. .................. | 386/52 |
| 5,966,121 A * | 10/1999 | Hubbell et al. ............. | 345/328 |

FOREIGN PATENT DOCUMENTS

| | | |
|---|---|---|
| EP | 0 790 737 A2 | 8/1997 |
| EP | 0 849 736 A1 | 6/1998 |
| WO | WO 94/01971 | 1/1994 |
| WO | WO 97/39577 | 10/1997 |
| WO | WO 98/46012 | 10/1998 |

OTHER PUBLICATIONS

Epstein, D.A., et al., "The IBM Power Visualization System: A Digital Post–Production Suite in a box," SMPTE Journal, vol. 104, No. 3, Mar. 1995, pp. 125–133.

Patent Abstracts of Japan, vol. 097, No. 007, Jul. 1997 and JP 09 083867 A, Sony Corp, Mar. 1997.

* cited by examiner

*Primary Examiner*—John W. Miller
*Assistant Examiner*—Paulos Natnael
(74) *Attorney, Agent, or Firm*—Peter J. Gordon, Esq.

(57) ABSTRACT

A non-linear video editing system includes a graphical user interface to facilitate editing of video clips in a composition. The system includes the ability to display and edit a video frame on a field-by-field basis. Each field can be edited separately from the other field of the same frame. Additionally, inter-field jitter, present when fields are displayed individually, is removed by determining which field includes the top-most line of the frame and adjusting accordingly.

18 Claims, 10 Drawing Sheets

GRAPHICAL USER INTERFACE FOR FIELD-BASED DEFINITION OF SPECIAL EFFECTS IN A VIDEO EDITING SYSTEM

FIELD OF THE INVENTION

This invention is related to a method and apparatus for defining special effects in a non-linear video editing system. More particularly, special effects can be defined through a graphical user interface on a field-by-field basis, that is, within a video frame.

BACKGROUND

A non-linear video editing system, such as the Media Composer® video editing system available from Avid Technology, Inc. of Tewksbury, Massachusetts, stores video and audio data as files on storage media such as a hard disk drive. A non-linear editing system permits an editor to define a video program, called a composition, as a series of segments of these files called clips. Each clip is labeled and information related to it e.g., length of clip, number of frames, time, etc. are also accessible. Since each clip is stored separately, it can be retrieved directly without having to pass through other clips. Clips can be retrieved and played back in any order. As a result, the clips can be sequenced in any order and this order can be changed any number of times as controlled by a user interface on the Media Composer® system. When a final composition is defined, the entire composition can be saved to a file for further processing or transmission. *Digital Filmmaking, The Changing Art and Craft of Making Motion Pictures* by Thomas Ohanian and Michael Phillips, ©1996, includes additional descriptions of these editing systems and is hereby incorporated by reference.

When special effects are to be introduced within the sequence of clips an editor will modify an image by either removing a portion or specifying where an effect is to be placed. The image can be modified in a number of known ways such as pixel-by-pixel intraframe manipulation or other "painting" programs. Often, painting or pixel manipulation is insufficient to provide the results that are needed. The shortcomings of these known programs are due to the manipulation of images on a flame-by-frame basis when it is necessary to pay attention to the next level of detail, i.e., the field data.

In a video format, images are typically captured in a series of video fields. These video fields are made up of hundreds of horizontal scan lines that are essentially "slices" of the image in the video field. Each scan line is made up of a plurality of pixels. The raw video data that forms the pixels is referred to as YUV data. Each pixel has varying YUV values that can be converted into varying red, blue and green (RGB) level values to determine the color of the pixel. In order to conserve bandwidth in the playback of the video images, consecutive fields are interlaced to make one composite video frame from two consecutive video fields. Interlacing is done by vertically alternating horizontal scan lines from each consecutive field to form one video frame. In the NTSC video format, video images are captured at 60 fields per second. Interlacing two consecutive fields results in video that is transmitted at 30 frames per second. There are other video formats that have different scan rates, such as PAL, which has a scan rate of 50 fields per second or 25 frames per second.

Video field interlacing is schematically shown in FIGS. 1A and 1B. FIG. 1A shows two consecutive video fields $A_1$, $A_2$. Each of the video fields $A_1$ and $A_2$ consists of hundreds of horizontal scan lines that make up an image. In FIG. 1A, the scan lines that make up field $A_1$ are labeled $A_{L1}$, and the scan lines that make up field $A_2$ are labeled $A_{L2}$. FIG. 1B schematically shows how fields $A_1$ and $A_2$ are interlaced to form video frame $A_{12}$. As shown in the figure, video frame $A_{12}$ comprises the scan lines $A_{L1}$ and $A_{L2}$ in an alternating fashion from the top of the frame to the bottom of the frame. This interlacing of video fields $A_1$ and $A_2$ results in the video transmission rate of approximately 30 frames per second.

Conventionally, once the video fields are interlaced, editing is performed either by displaying both fields, or by displaying just one field and doubling the scan lines to fill the frame.

Displaying both fields presents a problem because there is a slight timing offset between each field. Therefore, when the fields are interlaced to form the video frame, the image may be somewhat choppy or blurred due to the difference in time between the images in each field. During the editing process, objects that are moving in an image of the video field cannot be accurately outlined, because moving objects will be displayed in two separate locations in the frame, one location for each video field.

Doubling the scan lines of a field is done by a process called "scan doubling." In the process of scan doubling, each scan line in the video field is doubled, in order to fill the entire frame. The doubled field is then edited. However, since there is a difference in time between each video field, scan doubling tends to display data in the video frame that may be false or misleading, since it is compensating for the time offset between each video field. Scan doubling causes half of the spatial information of the frame to be lost because it is contained in the video field that is not shown in the scan doubled frame. Scan doubling is particularly problematic when the fields contain still or slow moving objects, since the information that is lost is still accurate information. This loss of data tends to make editing of the fields difficult, inaccurate and time consuming. Additionally, there is still some "jitter" when moving from field to field since the "top-most" line of the frame is only found in one field.

It is also possible that there is "motion" within a frame, that is, an image's motion is not consistent from the first field in the frame to the second field. Special effects editors need access to the second field in order to accurately place the effect or to accurately modify the image. Typically, non-linear video editing systems do not display the second field of a flame, only the first field has been displayed with scan doubling. Since only the first field is being viewed, any differences between the first and second fields will not be accounted for and the effect will not be accurate.

Thus, any special effects that are necessary must be implemented on a separate effects system, the modified clip created and then input to the non-linear editing system. If changes are necessary, the editor must return to the separate effects system, modify the clip and return it to the non-linear editing system. This is a time-consuming and, therefore, inefficient process that hampers the creativity of the editor.

Additionally, in a non-linear editing system, as described above, clips are sequenced together to create a final composition. In some instances, the source for a clip might be film which has been converted from its scan rate of 24 frames per second to that of NTSC video, 30 frames per second. It is possible, therefore, that an inter-frame scene change could occur. In other words, the first field of the frame may be unrelated to the second field. If this were to happen in a non-linear editing system that only displayed the first field of a frame, then this "discontinuity" would be unseen and could possibly affect any post-processing done to the video image.

Accordingly, there is a need for a non-linear video editing system that provides editing and viewing capabilities on a field by field basis. This would allow for special effects editing on a field, thus providing more detailed results. Additionally, a non-linear video editing system is needed that has the capability to edit either field of a frame.

SUMMARY

A non-linear video editing system, with the capacity to display and modify video frames on a field-by-field basis, has the capability to implement special effects on a field-by-field basis, thus increasing the accuracy of the effect. A user may incrementally step through footage, so that every field can be seen. A time code display indicates which field the user is viewing or manipulating. A keyframe can be attached to a field and interpolation can be performed between fields marked with a keyframe.

A graphical user interface may be provided through which a user can select a specific clip among many clips, select or mark a particular frame within the clip, select or mark either field within a frame, display either field, edit either field and insert a special effect in either field. A keyframe scale bar is provided to allow the user to "zoom into" a position in time. The user can then make subtle adjustments to key frame selection and positioning.

A rotoscoping mode allows a user to work on shape selection where shapes cannot be interpolated easily. When the mode is turned on, the shapes are visible and are active only for the keyframes on which they are created. This allows a user to work quickly on sequences where there is little or no coherency between fields.

In one embodiment of the present invention a non-linear video editing system for processing a video image includes means for displaying the video image; means for selecting a frame within the video image; means for displaying one of a first field and a second field of the selected frame; means for indicating which field is being displayed; means for marking at least one of the first field and the second field; and means for modifying at least one of the first field and the second field.

In another embodiment, the modifying means comprise means for deleting a portion of the field. Additionally, the system includes a graphical user interface to receive information from and present information to a user relative to at least one of the first field and the second field.

In yet another embodiment of the present invention, a computer-implemented method of adjusting for a positional displacement between a displayed first field of a first frame and a displayed second field of the first frame includes storing flame data of the first frame in a frame buffer, the flame data including scan lines of the first and second fields; accessing the frame data; determining a top-most scan line and its associated field from the accessed frame data; and adjusting the display of the field not associated with the top-most scan line.

In a further embodiment, the display adjusting step includes inserting and displaying a blank line at a beginning of the field not associated with the top-most line; scan doubling all lines other than a last line in the field not associated with the top-most line; and displaying the last line of the field not associated with the top-most line only once.

BRIEF DESCRIPTION OF THE DRAWINGS

These and other features, aspects and advantages of the present invention will become better understood with regard to the following description, appended claims and accompanying drawings where:

DETAILED DESCRIPTION

The present invention will be more completely understood through the following detailed description which should be read in conjunction with the attached drawings in which similar reference numbers indicate similar structures. All references cited herein are hereby expressly incorporated by reference.

Figure 1A:
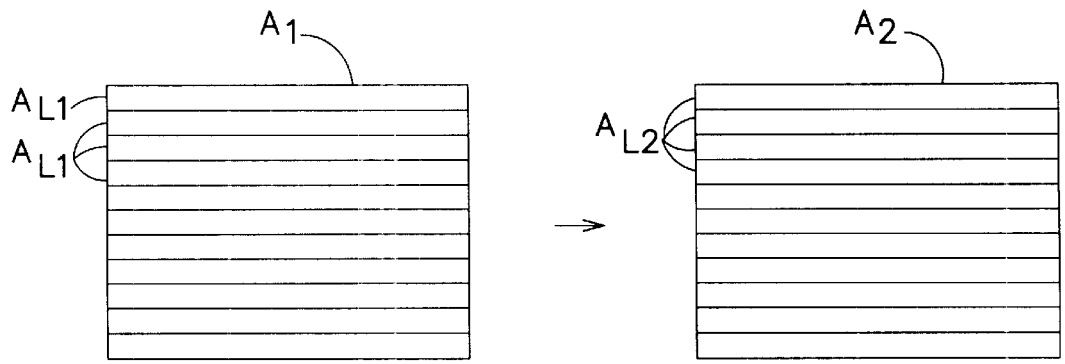
FIG. 1A is a schematic diagram that depicts two consecutive video fields.
Figure 1B:
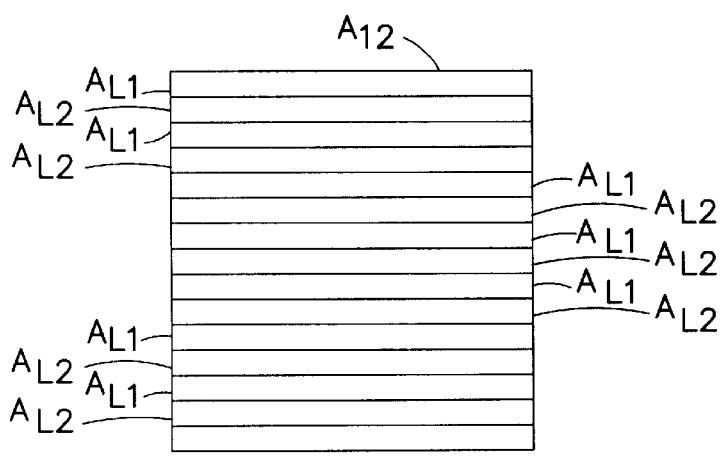
FIG. 1B is a schematic diagram that depicts the video fields of FIG. 1A interlaced to form a video frame.
Figure 2:
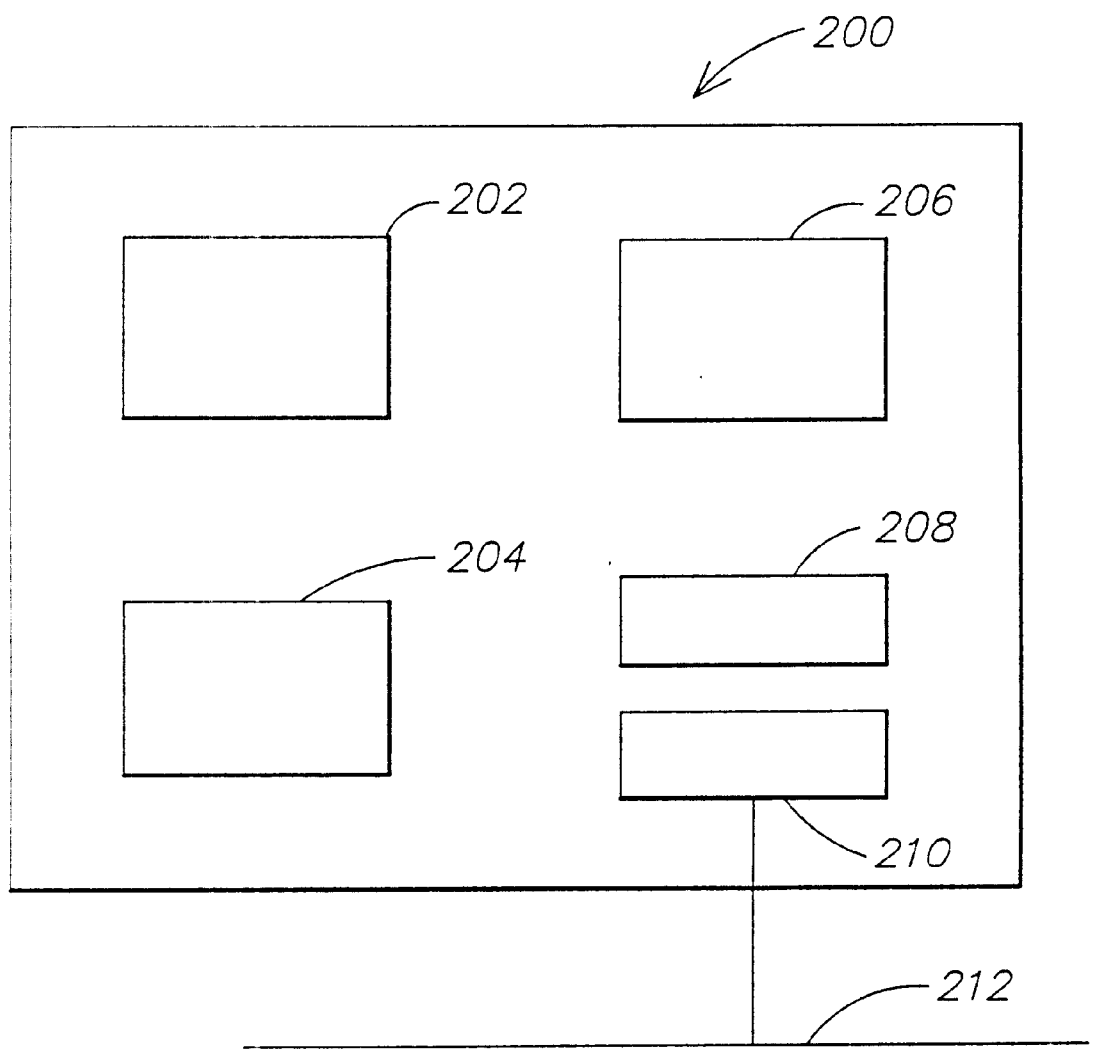
FIG. 2 is a schematic overview diagram of a computer system that is used in conjunction with the present invention.

An example of a computer system that may be used to practice the present invention is depicted in FIG. 2. The computer system 200 includes a processor 202, one or more storage devices 204, such as a disk drive, and a monitor 206. Computer system 200 typically includes a memory 208 for storing programs and data during operation of the computer system. The computer system may also contain one or more communication devices 210 that connect to a communication network 212. The invention may be embodied in editing software that could be stored on the disk drive, on a floppy disk or on a CD-ROM, for example. An example of such a system is the Media Composer® System from Avid Technology, Inc. of Tewksbury, Mass.

A non-linear editing system generally provides access to media data at a resolution defined by frame boundaries. This resolution is based on SMPTE time codes that are expressed in hours, minutes, seconds and frames. In order to provide access to field data, each field in a media data file is indexed. A standard procedure for accessing media data files may be modified to randomly access the image data at the resolution of a field. Other procedures that access data files and data structures defining effects also may be modified to define the effects or request data at the resolution of a field to permit paint effects to be defined on a field-by-field basis.

In operation, an editor desires to assemble a video composition consisting of one or more video clips. The desired clips are selected and placed in the desired order. The graphical user interface allows the editor to visually determine, among other information, the location of a clip and the total run time.

To place a special effect on a field of a frame, the field is marked as a "keyframe." The special effect can then be applied to the keyframe. Often, a special effect will be implemented between two frames or fields marked as keyframes. With the present invention, the first field of the first frame and the second field of the last frame can be selected. This selection assures that the effect begins and ends on proper boundaries. The effect will be interpolated so as to move between the two keyframes. If, however, the movement needs to be adjusted, due to intra-frame differences, because each field can be edited, these differences can be accounted for.

Figure 3A:
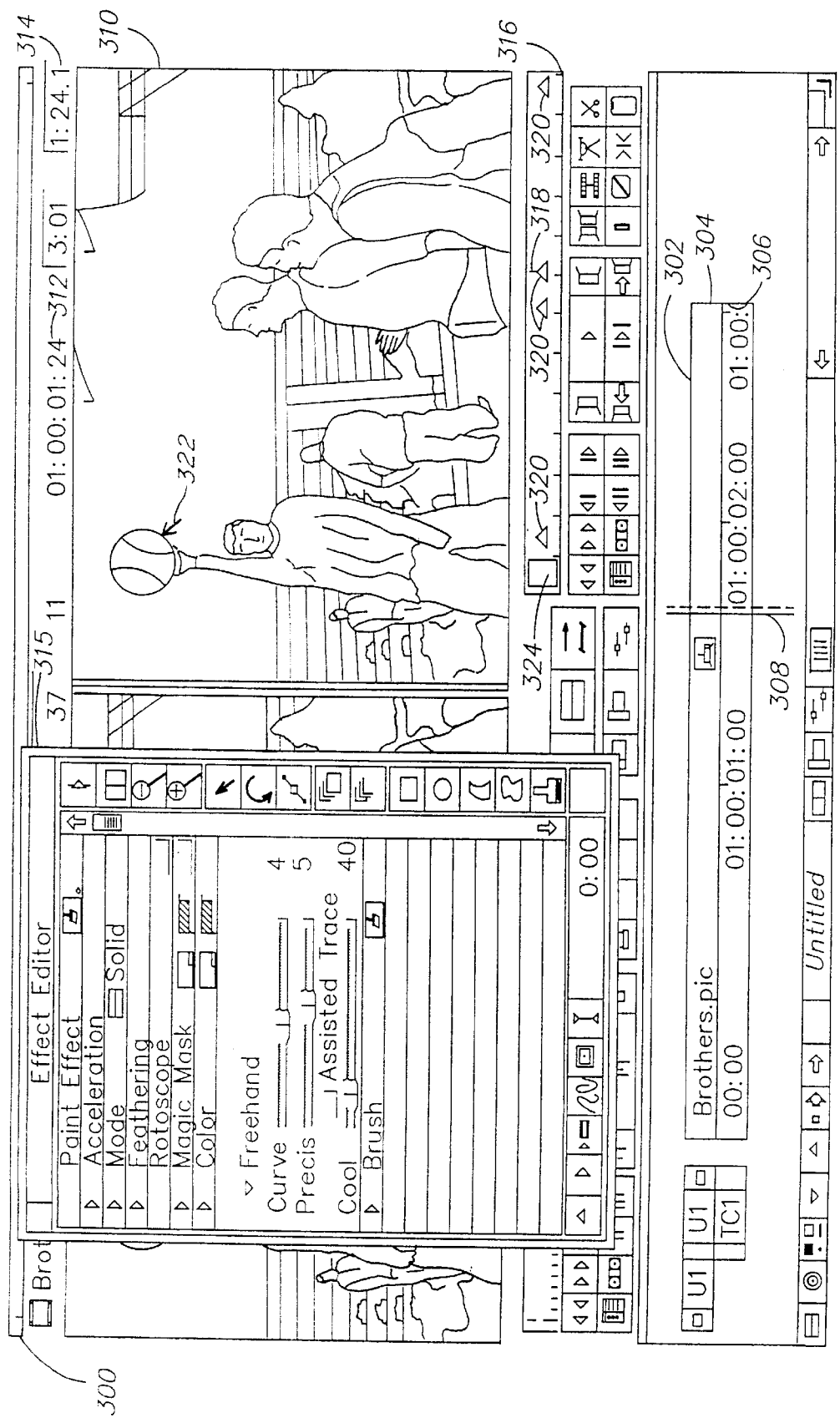
FIGS. 3a–3c represent a graphical user interface according to the present invention as displaying a first field of a frame.
Figure 3B:
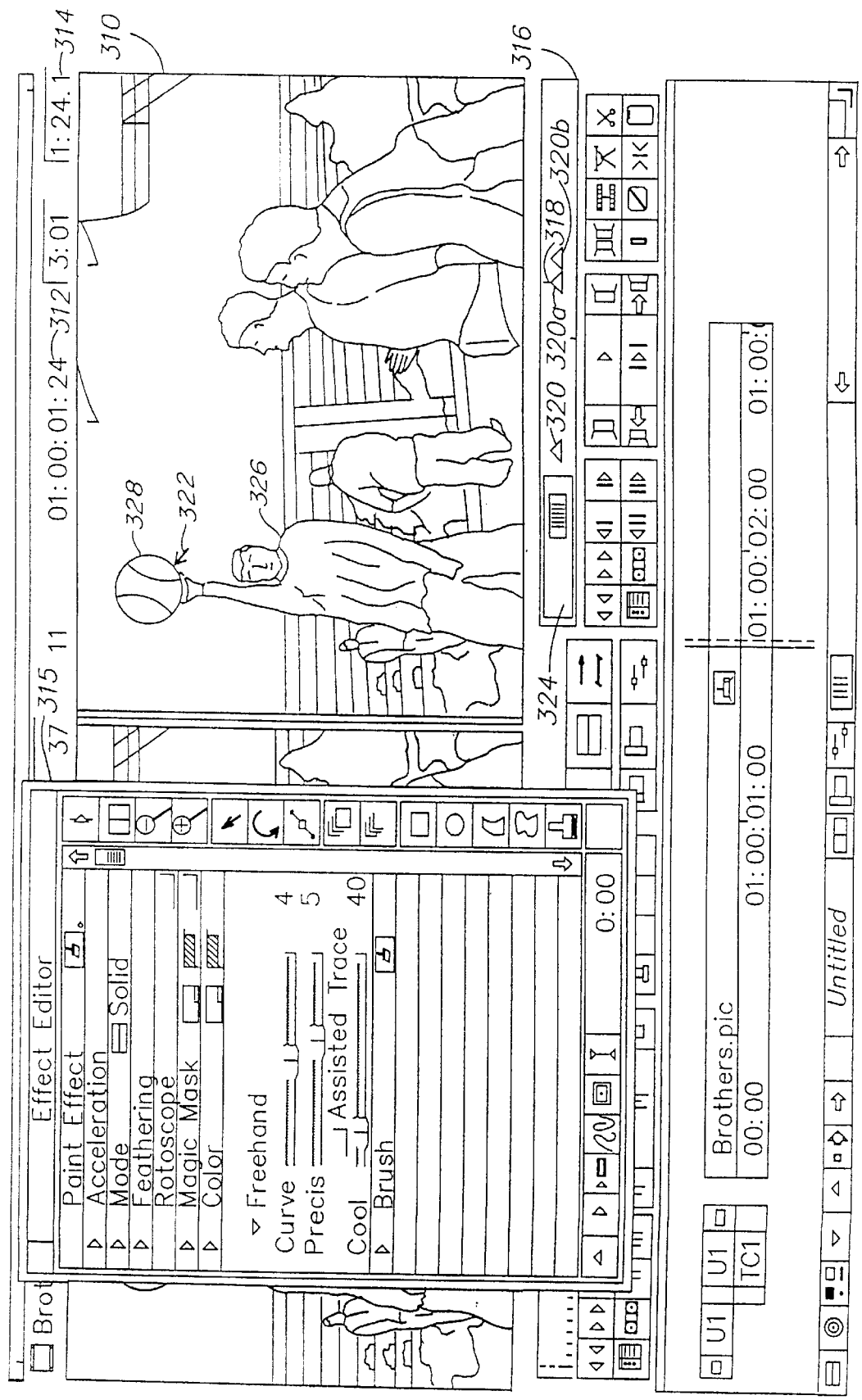
Figure 3C:
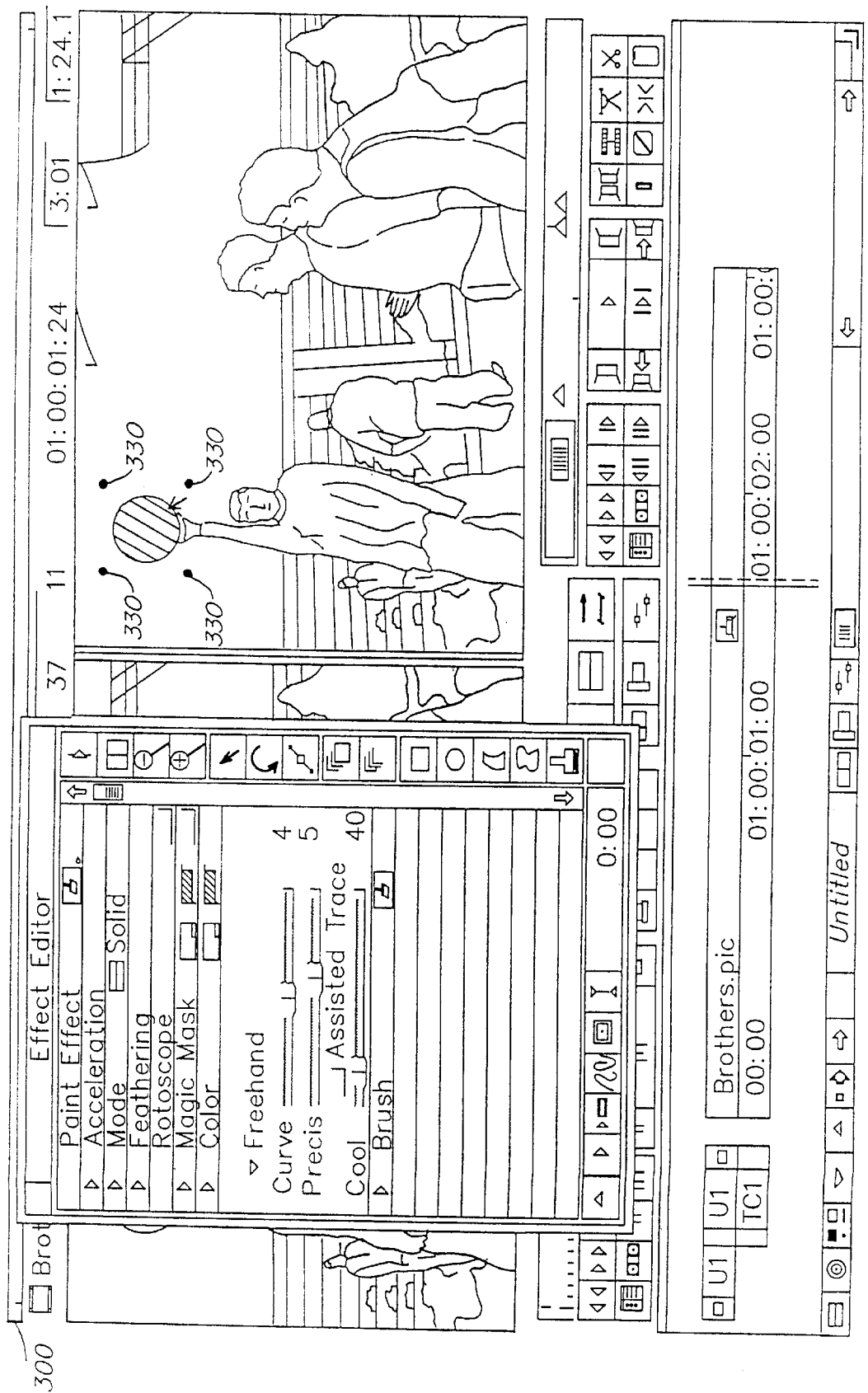

A graphical user interface 300, as shown in FIGS. 3a–3c, may be provided. A composition bar 302 includes a title bar 304 and time bar 306. The title bar 304 provides the name assigned to each video clip in the composition. As shown, the clip is entitled "Brothers.pic." It is of course clear that there could be more than one clip in the composition. Only one is shown here for the sake of clarity. The time bar 306 represents the cumulative time of the composition starting at a time 00:00. The time is in the format of HH:MM:SS:FF where HH is hours, MM is minutes, SS is seconds and FF is the frame number. In the NTSC video format there are 30 frames per second. A time cursor 308 represents the point in time within the clip that is currently being displayed.

A display window 310 presents the current frame for viewing. Actually, this window is presenting one of the two fields of the frame. The time location of the frame, as identified by the time cursor 308 on the composition bar 302 is presented as numeric time data 312 above the display window 310. In the example shown, the frame currently being displayed is at 01:00:01:24. Thus, it is the twenty-fourth frame at one hour, one second from the beginning of the composition.

The editor is provided with a visual indication as to which field of the frame is being displayed. Field indicator 314 is showing that this is the first or "odd" field of the frame, 1:24.1.

The display window 310 is presenting the field in a non-interlaced format. Thus, any of the known methods of displaying only one field of a frame can be used, such as scan-doubling, as already discussed above.

A display window time bar 316 provides the editor with a finer depiction of the time of the displayed frame. A window time bar cursor line 318 indicates the same time position as that of the time cursor 308 and the numeric time data 312.

An effect editor window 315 provides the editor with various tools or effects that can be affected on a flame or series of frames. A frame or field on which an effect is to be placed is marked as a keyframe with a triangular keyframe marker 320. By choosing an effect from the window 315 and using a cursor arrow 322, changes to the frame or field can be made. A first keyframe can be used to indicate where an effect starts and then a second keyframe can be used to indicate where it ends. The effect would then be interpolated across the frames intermediate the two keyframes. However, where there is intra-frame movement the interpolation will not account for this and the effect will be inaccurate.

Additional "granularity" or detail of the display window time bar 316 is provided by a keyframe scale bar function 324. The keyframe scale bar 324 implements a function that expands the time bar 316 to even more detail. Note that, in FIG. 3a, it appears that there are four (4) keyframe markers 320 that have been set.

Referring now to FIG. 3b, the same field and frame as that of FIG. 3a is being displayed. In FIG. 3a, however, the keyframe scale bar 324 has been activated to further expand the time scale on the time bar 316. It can now be seen that the cursor line 318, while appearing to be on only one keyframe in FIG. 3a is, as shown in FIG. 3b, still only on one keyframe 320a but there is actually another keyframe 320b next to it In actuality, these two keyframe markers 320a, 320b are indicating an effect being placed on each field of the two fields that make up the frame.

The scene depicted in the display 310 is that of a person 326 shooting a basketball 328 toward a basket (not shown). A special effects editor may desire to change the basketball 328 into something else. As per the present invention, the editor would select that portion of the image that is the ball 328, as shown in FIG. 3c, by marking the ball 328 with markers 330 and highlighting the ball. As already discussed, this first field, 1:24.1, as indicated by the field indicator 314, has been identified as a key frame. Thus, the field has been marked so as to have a special effect implemented upon it.

Normally, an editor operates on only the first field of a frame. It is assumed that there are no intra-frame scene changes that would affect the perceived display. The effect that was implemented, for example, on the first field of the frame shown in FIG. 3c would normally carry over to the second field. As already discussed, however, intra-frame scene changes do occur and their occurrence can change the effect.

Figure 4A:
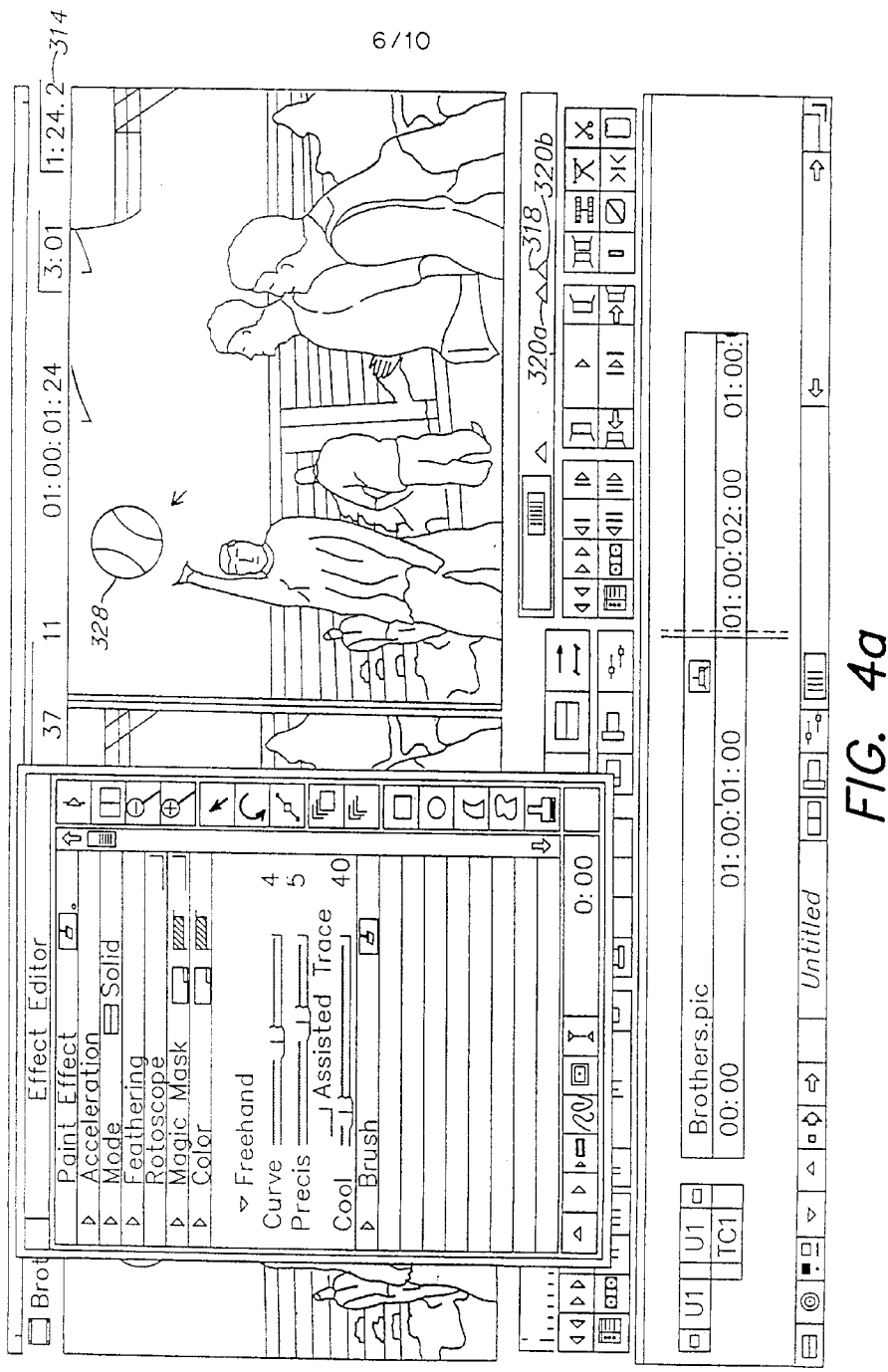
FIGS. 4a and 4b represent the graphical user interface according to the present invention as displaying a second field of the flame.

Referring now to FIG. 4a, the second field of the frame shown in FIGS. 3a–3c is shown. The field indicator 314 is now showing 1:24.2 with the "0.2" component representing the second or "even" field of the frame. The window time bar cursor line 318 is now positioned on keyframe indicator 320b. Looking at the image depicted in the second field, one can see that there is a difference between the location of the ball 328 as shown in FIG. 3b and that shown in FIG. 4a. In reality there probably would not be that significant a difference between the two fields. The image has been modified, however, to accentuate this difference so as to aid in the explanation of the present invention. Since there is such a difference between the first and second fields, the effect implemented in the first field, as shown in FIG. 3c, would not properly carry over to the second field.

Figure 4B:
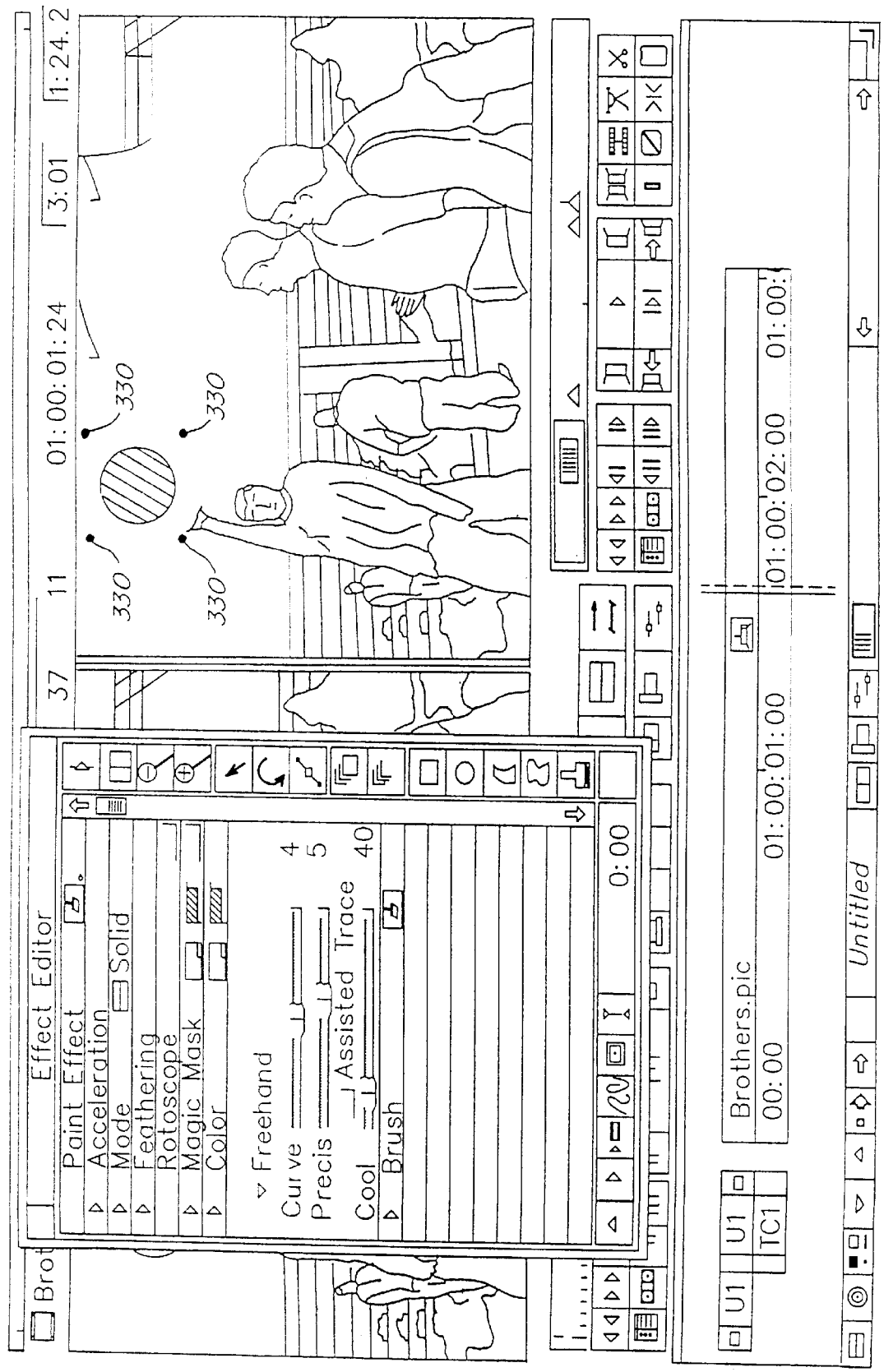

The editor marks the second field as a keyframe and then inserts the effect. As shown in FIG. 4b, the ball 328 depicted in the second field of the frame can be highlighted or marked, as indicated, and the same effect implemented in the first field, will be implemented in the second field. When the video clip is run in a continuous mode, the effect will be smoothly integrated into the frame because the present invention allows the operator to adjust the effect for the intra-frame scene change. Without the ability to manipulate each field, the effect placed in the first field would have been implemented on a part of the second field not related to the image of the ball 328.

A rotoscoping mode of operation is also provided. Specifically, there may be instances where the operator needs to place a shape on an image and a change in the shape cannot be interpolated easily. For example, a person walking is difficult to interpolate because of the complexity of the motion. When the rotoscoping mode of the system is turned on, the shape will only be visible and active for the keyframes on which they have been created. In a sequence where there is little coherency between frames, the operator can work quickly on a flame by frame basis, in actuality, a field by field basis, to place the shapes.

Figure 5:
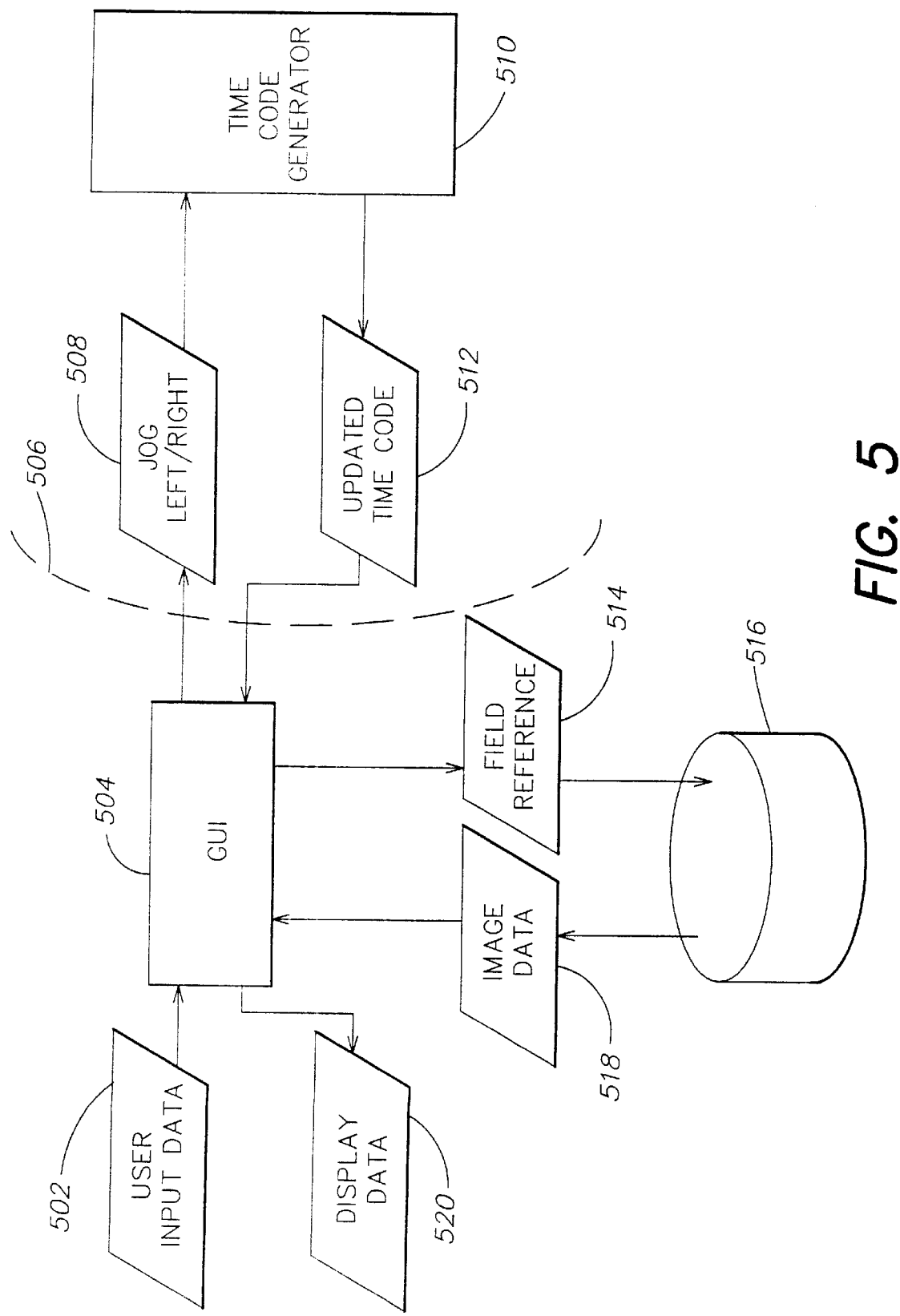
FIG. 5 is a data-flow diagram showing operation of the graphical user interface of the present invention.

The operation of the graphical user interface and its functions will now be further described. As shown in FIG. 5, user input data 502 is presented to the graphical user interface (GUI) function 504. The user data can be presented through operation of any known input device such as a keyboard, mouse, trackball, light pen, etc. The GUI function 504 translates the received input data and presents it to the image manipulation function 506. The image manipulation function 506 includes many different functions. As shown in FIG. 5, the GUI 504 has interpreted the user input data 502 as being related to a "jog" function. Accordingly, jog left/right data 508 is presented to the image manipulation function 506. A time code generator function 510 determines the appropriate values for the needed time codes and presents updated time code data 512 to the GUI function 504. The GUI function 504 interprets the updated time code data and generates field reference data 514. The field reference data 514 is used to access stored image data in a storage device 516, such as a hard disk drive. Image data 518 is retrieved and received by the GUI function 504. Finally, display data 520 is presented by the GUI function to the display device (not shown in FIG. 5), resulting in a "jogged" image being presented to the editor as directed by the user input data 502.

The jitter that is observed when stepping from one field to the next is also removed by the present system. In operation, as is known, the frame data is stored in a frame buffer prior to display. The present invention adjusts for "topness" by determining which line is "top-most" and which field the top-most line is in. Once the top-most line and its field are identified, the even field is adjusted depending on the topness. Then, when the fields are displayed consecutively, the jitter between the two will have been reduced. This will allow the operator to more accurately place any effects that are being implemented.

The following, in conjunction with FIGS. 6a–6f, will describe the "jitter" correction.

A substantially triangular form 602 is shown as rendered into an interlaced frame buffer. As can be seen, all of the horizontal scan lines 1–8 are presented in an interlaced display. For this example, the first field of the frame contains the top-most line of the frame although the top most line has all of the pixels turned off (all white in the figure).

Figure 6A:
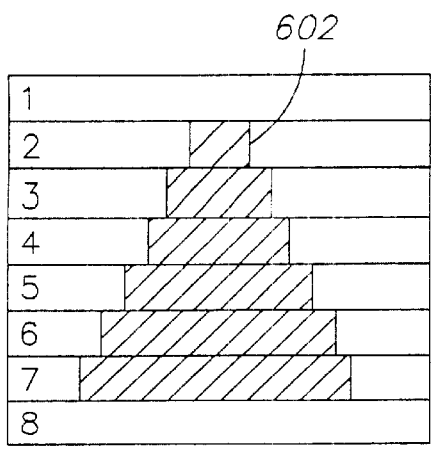
FIGS. 6a–6f depict operation of another aspect of the present invention for removing jitter perceived from one field to a next.
Figure 6B:
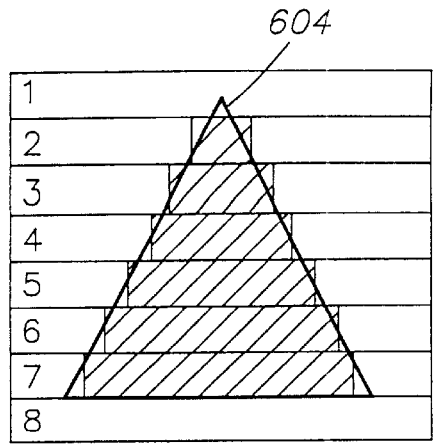

In operation, a user may desire to place a graphic overlay 604 upon the form 602. The graphic overlay 604 as positioned on the rendered triangle 602 is shown in FIG. 6b. Similar to FIG. 6a, the representation of FIG. 6b is also interlaced.

Figure 6C:
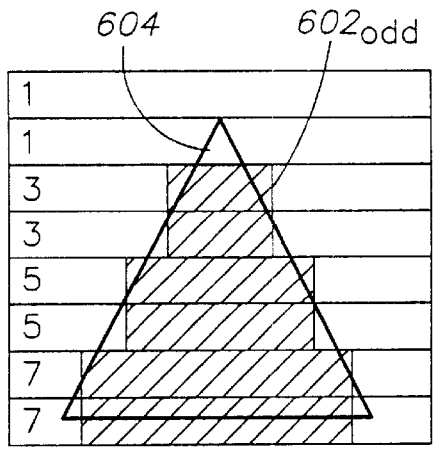

The first field of the frame is displayed using line duplication or line doubling, as previously discussed. FIG. 6c represents the doubling of the odd scan lines: 1,1,3,3,5,5,7,7. The odd image $602_{odd}$ is effectively shifted down by one half of a scanline, as shown in FIG. 6c. This downward shift can be better seen by comparing FIG. 6c to FIG. 6b, i.e., the original interlaced image. The graphic overlay 604 is also shifted down to reflect this change so as to coincide with the odd image $602_{odd}$.

Figure 6D:
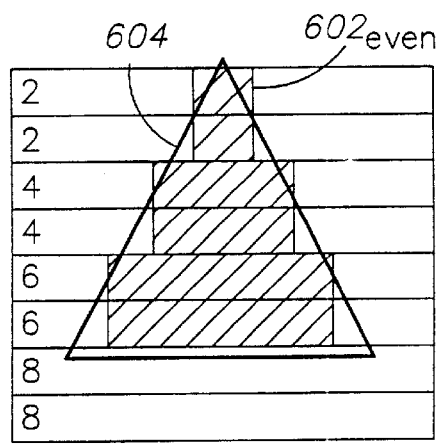

The second field is also displayed using line duplication, as shown in FIG. 6d. As shown, the even scan lines are doubled: 2,2,4,4,6,6,8,8. The even image $602_{even}$ is shifted up by one half of a scanline relative to the original interlaced image 602 shown in FIG. 6b. The graphic overlay 604 is also shifted up to coincide with the even image $602_{even}$.

When stepping between the first field and the second field, as shown in FIGS. 6c and 6d, the image seems to shift up by one full scanline. This is seen as image "jitter." So as to make placement of the graphic overlay 604 easier, the overlay 604 is moved according to which field is being displayed. In this manner, the overlay is positioned properly relative to the image 602.

Another solution provided by the system is to move the second field, i.e., the field that does not have the top-most line, down by one full scanline. This can be done by displaying a blank scanline X at the top of the second field, as shown in FIG. 6f. Since the blank scanline X has been added, the last scanline 8 in the second field only appears once. The loss of this last scanline is inconsequential since the bottom of the image is usually of no, or at least very little, importance to the operator.

Figure 6E:
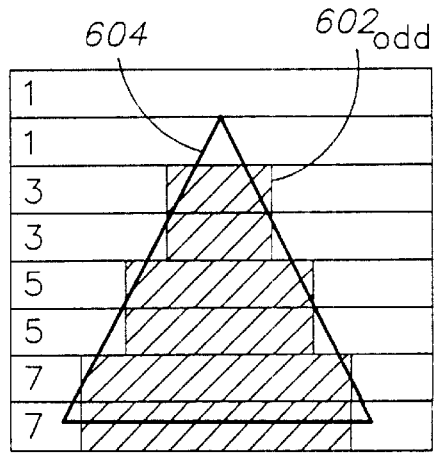
Figure 6F:
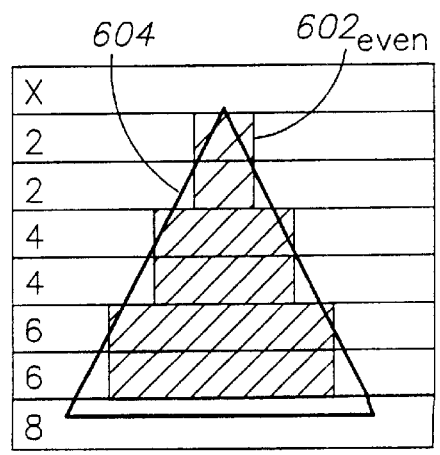

When stepping between the first field and the second field using this method, as from FIG. 6e (FIG. 6e is the same as FIG. 6c) to FIG. 6f, the jitter in the overlay 604 is diminished and the jitter in the rendered image is reduced. This can be observed by shifting one's view from FIG. 6e to FIG. 6f and back.

Figure 7:
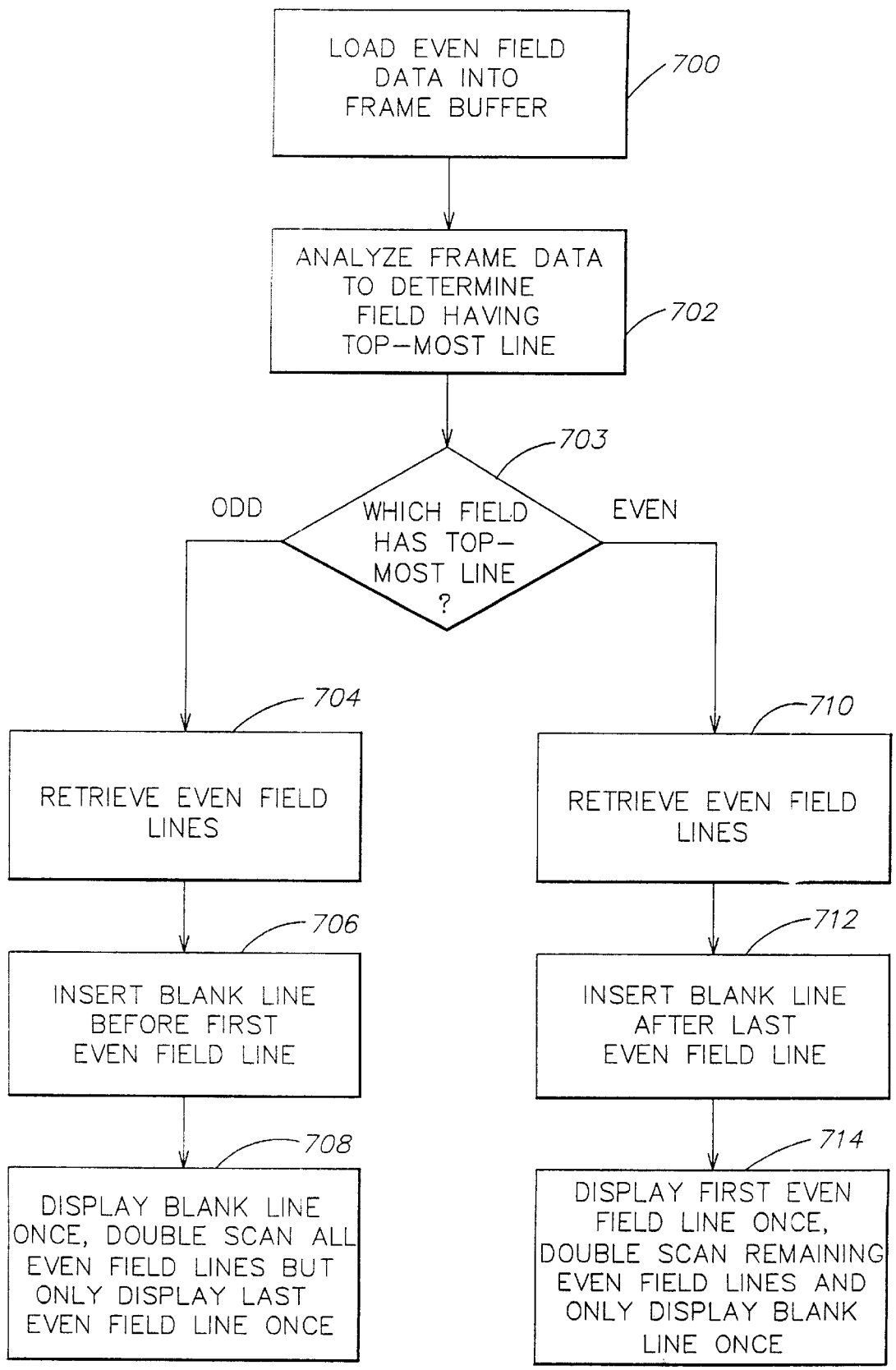
FIG. 7 is flowchart for the method relative to the operation shown in FIGS. 6a–6f.

The steps which are performed in removing the jitter from one field to another will now be described. The odd field will always be displayed using line doubling. The even field data is loaded into the frame buffer, step 700, as shown in FIG. 7. The flame data is analyzed to determine the field having the top-most line, step 702. At step 703, if the odd field has the top-most line, control passes to step 704 where the even field lines are retrieved. A blank line is inserted before the first even line field, step 706. The even field is displayed by displaying the blank line once, scan doubling all even field lines other than the last even field line and only displaying the last even field line once.

Returning to step 703, if the even field has the top-most line of the frame, control passes to step 710 where the even field lines are retrieved. A blank line is inserted after the last even field line, step 712. The even field is displayed by displaying the first even field line once, scan doubling all remaining even field lines and only displaying the blank line once.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A computer-implemented method of displaying interlaced video data, the method comprising:

accessing frame data of a frame, the frame data including scan lines of a first field and a second field;

in response to a user request, displaying the first field as a frame;

placing a graphic overlay on the displayed first field at a position according to a vertical positional offset of the first field relative to the second field;

in response to a user request, displaying the second field as a frame; and placing a graphic overlay on the displayed second field at a position according to the vertical positional offset of the first field relative to the second field.

2. The method of claim 1, wherein displaying the first field comprises:

inserting and displaying a blank line at a beginning of the first field;

scan doubling and displaying all lines other than a last line in the first field; and displaying the last line of the first field only once in the displayed frame.

3. The method of claim 1, wherein displaying the second field comprises:

inserting a blank line at an end of the second field;

displaying the first line of the second field only once in the displayed frame;

scan doubling and displaying all remaining lines in the second field; and displaying the blank line only once in the displayed frame.

4. A non-linear video editing system for displaying interlaced video data, comprising:

means for accessing frame data of a frame, the frame data including scan lines of a first field and a second field;

means, responsive to a user request, for displaying the first field as a frame;

means for placing a graphic overlay on the displayed first field at a position according to a vertical positional offset of the first field relative to the second field; and means, responsive to a user request, for displaying the second field as a frame;

means for placing a graphic overlay on the displayed second field at a position according to a vertical positional offset of the first field relative to the second field.

5. The system of claim 4, wherein the means for displaying the first field comprises:

means for inserting and displaying a blank line at a beginning of the first field;

means for scan doubling and displaying all lines other than a last line in the first field; and means for displaying the last line of the first field only once in the displayed frame.

6. The system of claim 4, wherein the means for displaying the second field comprises:

means for inserting a blank line at an end of the second field;

means for displaying the first line of the second field only once in the displayed frame;

means for scan doubling and displaying all remaining lines in the second field; and means for displaying the blank line only once in the displayed frame.

7. A computer-implemented method for processing video data, the video data comprising at least one frame, wherein each frame comprises a first field and a second field, the method comprising:

permitting an operator to select one of the first field and the second field of the at least one frame of the video data;

displaying the selected field as a frame;

permitting the operator to perform a rotoscoping operation on only the selected field; and displaying results of the rotoscoping operation on the displayed selected field.

8. The method of claim 7 wherein permitting the operator to perform a rotoscoping operation comprises:

permitting the operator to choose a mode of operation from a group of modes of operation that includes:
a mode of operation that permits the operator to perform a rotoscoping operation on only one field; and
a mode of operation that permits the operator to perform a rotoscoping operation on each field in a plurality of frames.

9. The method of claim 7, wherein displaying the selected field, if the selected field is the first field, comprises:

inserting and displaying a blank line at a beginning of the first field;

scan doubling and displaying all lines other than a last line in the first field; and displaying the last line of the first field only once in the displayed frame.

10. The method of claim 9, wherein displaying the selected field, if the selected field is the second field, comprises:

inserting a blank line at an end of the second field;

displaying the first line of the second field only once in the displayed frame;

scan doubling and displaying all remaining lines in the second field; and displaying the blank line only once in the displayed frame.

11. The method of claim 7, wherein displaying the selected field, if the selected field is the second field, comprises:

inserting a blank line at an end of the second field;

displaying the first line of the second field only once in the displayed frame;

scan doubling and displaying all remaining lines in the second field; and displaying the blank line only once in the displayed frame.

12. A nonlinear video editing system for processing video data, the video data comprising at least one frame, wherein each frame comprises a first field and a second field, comprising:

means for permitting an operator to select one of the first field and the second field of the by at least one frame of the video data;

means for displaying the selected field as a frame on a display;

means for permitting the operator to perform a rotoscoping operation on only the selected field; and means for displaying results of the rotoscoping operation on the displayed selected field on the display.

13. The method of claim 12 wherein the means for permitting the operator to perform a rotoscoping operation comprises:

means for permitting the operator to choose a mode of operation from a group of modes of operation that includes:
a mode of operation that permits the operator to perform a rotoscoping operation on only one field; and
a mode of operation that permits the operator to perform a rotoscoping operation on each field in
plurality of frames.

14. The system of claim 12, wherein the means for displaying the selected field, if the selected field is the first field, comprises:

means for inserting and displaying a blank line at a beginning of the first field;

means for scan doubling and displaying all lines other than a last line in the first field; and means for displaying the last line of the first field only once in the displayed frame.

15. The system of claim 14, wherein the means for displaying the selected field, if the selected field is the second field, comprises:

means for inserting a blank line at an end of the second field;

means for displaying the first line of the second field only once in the displayed frame;

means for scan doubling and displaying all remaining lines in the second field; and means for displaying the blank line only once in the displayed frame.

16. The system of claim 12, wherein the means for displaying the selected field, if the selected field is the second field, comprises:

means for inserting a blank line at an end of the second field;

means for displaying the first line of the second field only once in the displayed frame;

means for scan doubling and displaying all remaining lines in the second field; and means for displaying the blank line only once in the displayed frame.

17. A non-linear video editing system for permitting editing of interlaced video data, comprising:

means for accessing frame data of a frame, the frame data including scan lines of a first field and a second field;

means, responsive to a user selection of one of the first field and second field, for displaying the selected field as a frame using scan lines of the selected field and not the other field;

means for allowing a user to place a special effect on the displayed first field;

wherein the means for displaying displays at least one of the first and second fields as a frame according to a vertical positional offset between scan lines of the first field and corresponding scan lines of the second field; and wherein the means for allowing a user to place a special effect on the displayed selected field include means for displaying the special effect on at least one of the first and second fields at a position according to a vertical positional offset of the first field relative to the second field.

18. A computer-implemented method for enabling editing of interlaced video data, the method comprising:

accessing frame data of a frame, the frame data including scan lines of a first field and a second field;

in response to a user selection of one of the first field and second field, displaying the selected field as a frame using scan lines of the selected field and not the other field;

allowing a user to place a special effect on the displayed first field;

wherein displaying the selected field includes displaying at least one of the first and second fields as a frame according to a vertical positional offset between scan lines of the first field and corresponding scan lines of the second field; and wherein allowing a user to place a special effect on the displayed selected field includes displaying the special effect on at least one of the first and second field at a position according to a vertical positional offset of the first field relative to the second field.

* * * * *